J. S. LADOW.
WATER-WHEEL.

No. 193,454. Patented July 24, 1877.

Attest:
H. L. Perrine
Chas. F. Stansbury

Inventor:
Jacob S. Ladow
by C. M. Parks
Atty.

UNITED STATES PATENT OFFICE.

JACOB S. LADOW, OF MECHANICSVILLE, NEW YORK.

IMPROVEMENT IN WATER-WHEELS.

Specification forming part of Letters Patent No. 193,454, dated July 24, 1877; application filed September 3, 1875.

*To all whom it may concern:*

Be it known that I, JACOB S. LADOW, of Mechanicsville, Saratoga county, New York, have invented an Improved Water-Wheel Gate; and I do hereby declare the following to be a full and correct description of the same, reference being had to the accompanying drawings, in which—

Figure 1:
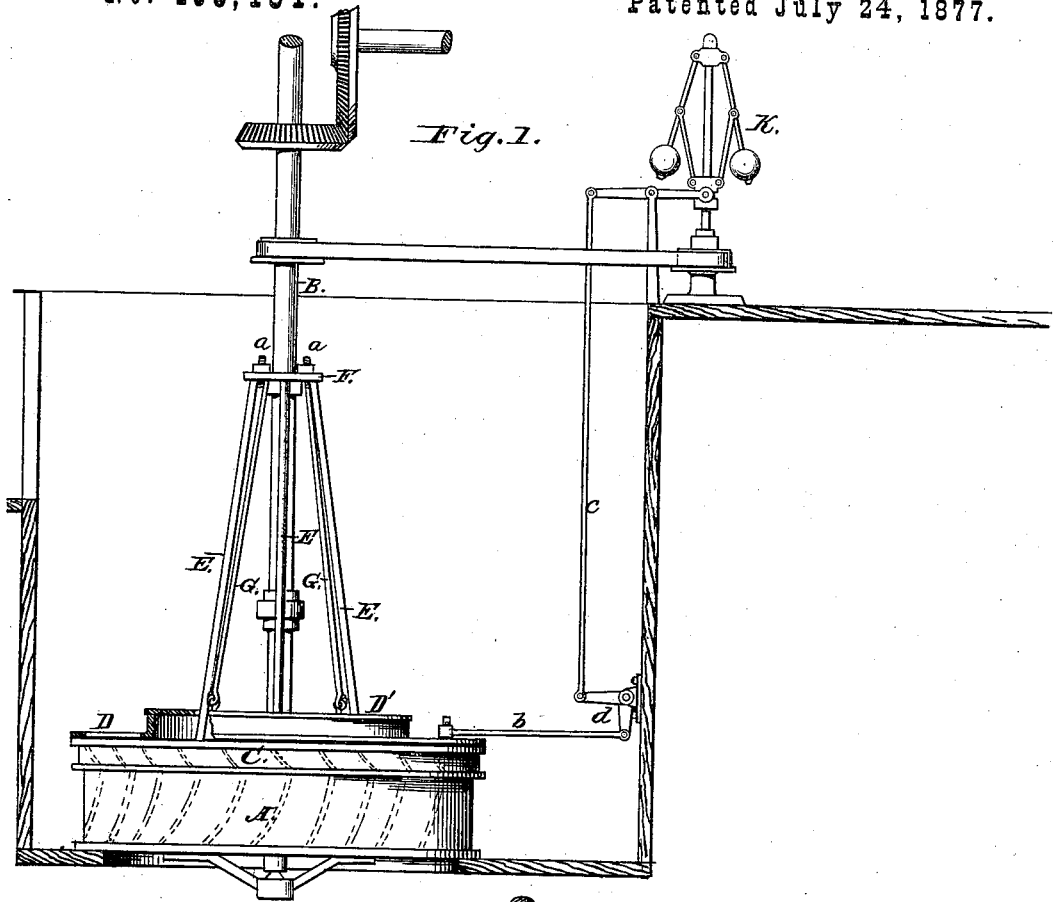
Figure 2:
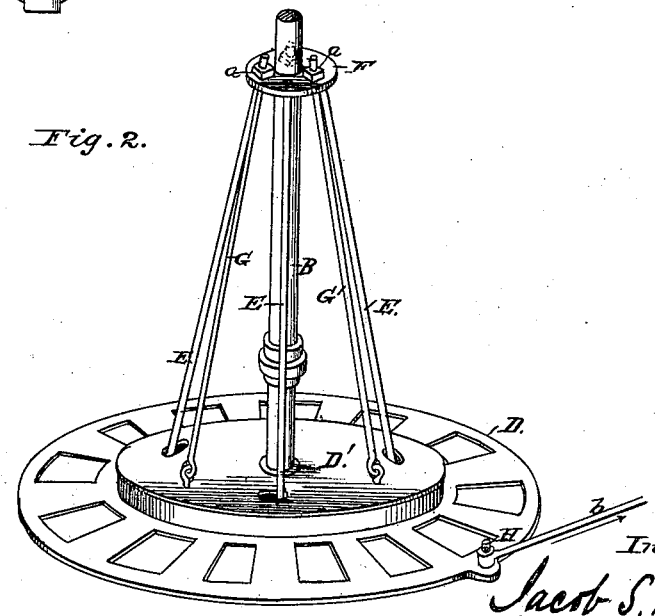

Figure 1 is a side view of my device, partly in section, and Fig. 2 is a perspective view.

The object of my invention is to construct the gate or register of a water-wheel in such a manner that it will move so easily that it may be operated by an ordinary governor; and my invention consists in adjustably hanging the gate in standards over the wheel, so that the circular swing can be effected by suitable lever-connections with a governor geared to the driving-shaft.

In the drawings, A is the water-wheel, and B the driving-shaft, hung in suitable bearings. Immediately above the wheel A is the guide C, containing the chutes corresponding with the buckets in the wheel A. Above the guide C is the gate D, having the raised portion D' in the center, and a series of holes corresponding with the chutes in the guide C. From the top of the case of the guide C arise three or more standards, E E E, which support a collar, F, loosely fitting around the main shaft B. Depending from the collar F are three or more adjustable hangers, G, which are attached by means of eyes to the upper side of the gate or register D'. Elongated holes are made in the top of the plate D' to allow the standards E to pass through, and also allow the plate a sufficient rotary motion. The driving-shaft also passes easily through said plate.

Upon the top of the hangers G are set-screws $a$ $a$ $a$, by which the gate D may be adjusted to any height desired. Upon the side of the gate D is a pin, H, to which is attached, by means of rods $b$ and $c$ and bell-crank $d$, the lever of the governor K, geared to the driving-shaft B.

The operation of my invention is as follows: The gate having been adjusted by means of the set-screws $a$ to a height just sufficient to clear the top of the guide C, the water may be let on the wheel A by means of a wicket, and, as the governor-balls are down, the chutes in the guide C will be open, and the water have free access to the wheel A; but as soon as the driving-shaft commences to revolve, it rotates the governor, and the balls, in their ascent, move the suspended gate D around, so that in proportion as the speed of the driving-shaft increases the water is cut off from the wheel, and vice versa.

Having thus fully described my invention, what I claim, and desire to secure by Letters Patent, is—

In combination with the gate D, the collar F, standards E, resting on the guide and supporting the collar F, and hangers G, constantly suspending the gate just out of contact with the guide, so that the gate may be operated by a governor, substantially as described.

The above specification of my said invention signed and witnessed at Washington this 30th day of August, A. D. 1875.

J. S. LADOW.

Witnesses:
   JOS. T. K. PLANT,
   C. M. PARKS.